(12) United States Patent
Herz et al.

(10) Patent No.: US 8,924,672 B2
(45) Date of Patent: Dec. 30, 2014

(54) DEVICE WITH PROCESSING UNIT AND INFORMATION STORAGE

(75) Inventors: Karl Herz, Munich (DE); Joerg Syassen, Otterfing (DE)

(73) Assignee: Infineon Technologies AG, Neubiberg (DE)

(*) Notice: Subject to any disclaimer, the term of this patent is extended or adjusted under 35 U.S.C. 154(b) by 418 days.

(21) Appl. No.: 13/022,835

(22) Filed: Feb. 8, 2011

(65) Prior Publication Data

US 2012/0203989 A1    Aug. 9, 2012

(51) Int. Cl.
*G06F 12/14* (2006.01)

(52) U.S. Cl.
CPC .................................. *G06F 12/1433* (2013.01)
USPC .................................. 711/163; 711/E12.098

(58) Field of Classification Search
CPC . G06F 21/79; G06F 12/1441; G06F 12/1433; G06F 12/1491; G06F 21/80
USPC ........................................... 711/163, E12.098
See application file for complete search history.

(56) References Cited

U.S. PATENT DOCUMENTS

| 7,512,743 | B2 | 3/2009 | Tom et al. | |
|---|---|---|---|---|
| 2010/0061555 | A1 | 3/2010 | Ducharme et al. | |
| 2010/0306848 | A1* | 12/2010 | Gellerich | ........................ 726/24 |

* cited by examiner

*Primary Examiner* — Jasmine Song
(74) *Attorney, Agent, or Firm* — SpryIP, LLC (57) ABSTRACT

Embodiments related to a processing unit and a first information storage are described and depicted. First information is provided from a first unit into a first information storage for performing a first operation of the processing unit. During the first operation of the processing unit second information is transferred between the processing unit and the first information storage. The first information storage comprises during the first operation of the processing unit an access protection for the first unit.

33 Claims, 10 Drawing Sheets

DEVICE WITH PROCESSING UNIT AND INFORMATION STORAGE

BACKGROUND

Data processing is nowadays implemented in almost every part of life with still an increasing trend for more and more implementations. For example, in data communications, security applications or automotive applications, data processing is provided in order to provide functions such as secure trans-mission of data, authentication and verification, or safe and secure mobility. Semiconductor devices such as microcontrollers typically having a program controller unit such as a CPU with one or more cores are programmed in order to achieve these functions. For storing the data and program, data memory and program memory associated with the CPU is provided. Furthermore, in some systems, a further processor such as a dedicated Co-processor may be provided for processing certain tasks or functions.

SUMMARY

According to one aspect, a method includes providing first information from a first unit into a first information storage for performing a first operation of a processing unit. During the first operation of the processing unit second information is transferred between the processing unit and the at least first information storage, wherein the first information storage is not accessible for the first unit during the first operation of the processing unit.

According to a further aspect, a method of restricting access to an information storage includes requesting an execution of a subroutine or command, wherein the execution is requested by a first unit and the subroutine or command is executed by a processing unit. Information for executing the subroutine or command is provided by the first unit to a first information storage. After the information is provided to the first information storage, access restrictions which restrict the access of the first information storage for the first unit is provided.

According to a further aspect, a device includes a processing unit to perform a data processing operation, a first information storage read-accessible and write-accessible by the processing unit and a first unit to initiate the data processing operation from the processing unit. An access control is provided which is configured or configurable to switch from a first access mode in which the first information storage is accessible by the first unit to a second mode in which the first information storage is not accessible for the first unit during the data processing operation.

According to a further aspect, a device includes an operation code storage and a data storage for storing data transferred between a first unit and a data processing unit. The data processing unit is configured to perform a data processing operation based on an operation code written in the operation code storage by the first unit. A controller is provided to protect the data storage from writing and reading by the first unit when the data processing unit performs the data processing operation and to enable writing and reading for at least the first unit when the data processing operation is completed.

According to a further aspect, an information storage arrangement includes an operation code storage and a data storage, wherein the data storage includes a plurality of sub-unit storages. A controller is provided to configure, prior to a data processing operation associated with an operation code stored in the operation code storage, for each of the plurality of sub-unit storages a read/write protection during the execution of the operation code.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number.

Figure 1A:
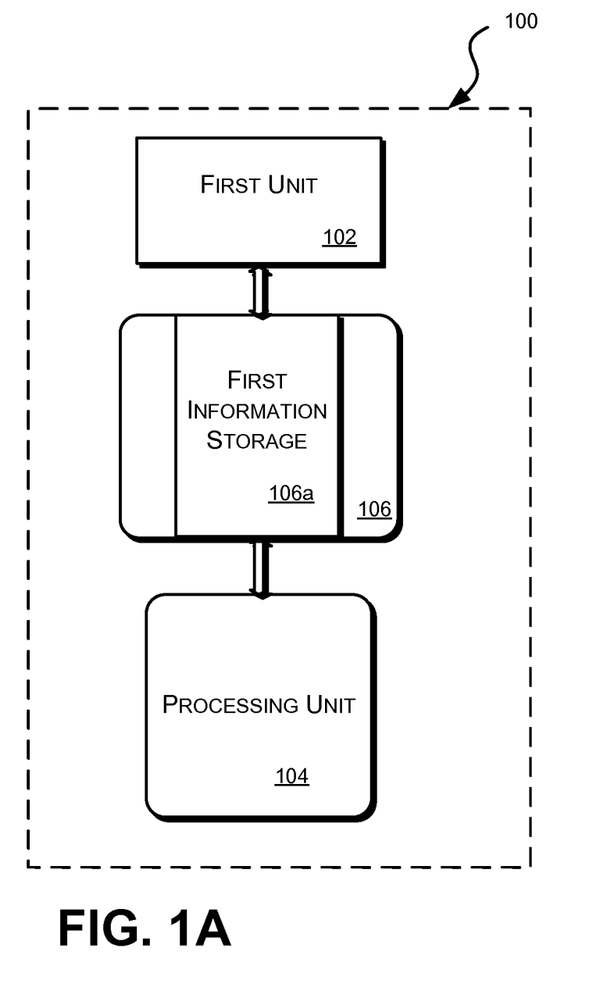
FIGS. 1A and 1B show block diagrams according to example embodiments.

Referring now to FIG. 1A, a device 100 is shown including a first unit 102, a data processing unit 104 for performing an operation requested by the first unit 102 and first information storage 106a as part of an information storage assembly 106. The device may be for example a microcontroller, a board including a microcontroller, a component in which one or more semiconductor devices are implemented etc.

In some embodiments, the first unit 102 may for example be a program-controlled unit. The first unit 102 may for example then include a CPU core. In some other embodiments, the first unit 102 may be a peripheral. The device 100 may include connection circuitry such as a bus for allowing communication between the first unit 102 and the processing unit 104 which are separated units. Furthermore interfaces for communication may be provided or associated with the first unit 102, the processing unit 104 and the first information storage 106a. As an example interfaces for transferring an operation code or data may be provided within the first unit 102.

The processing unit 104 may be assigned to the first unit 102 for performing data processing initiated by the first unit 102. For example, an application running on a main CPU core included in the first unit or a logic included in a peripheral may initiate a transfer of an operation code such as a command or a subroutine over a bus to an operation code storage associated with the processing unit 104 in order to request an operation from the processing unit 104.

Figure 1B:
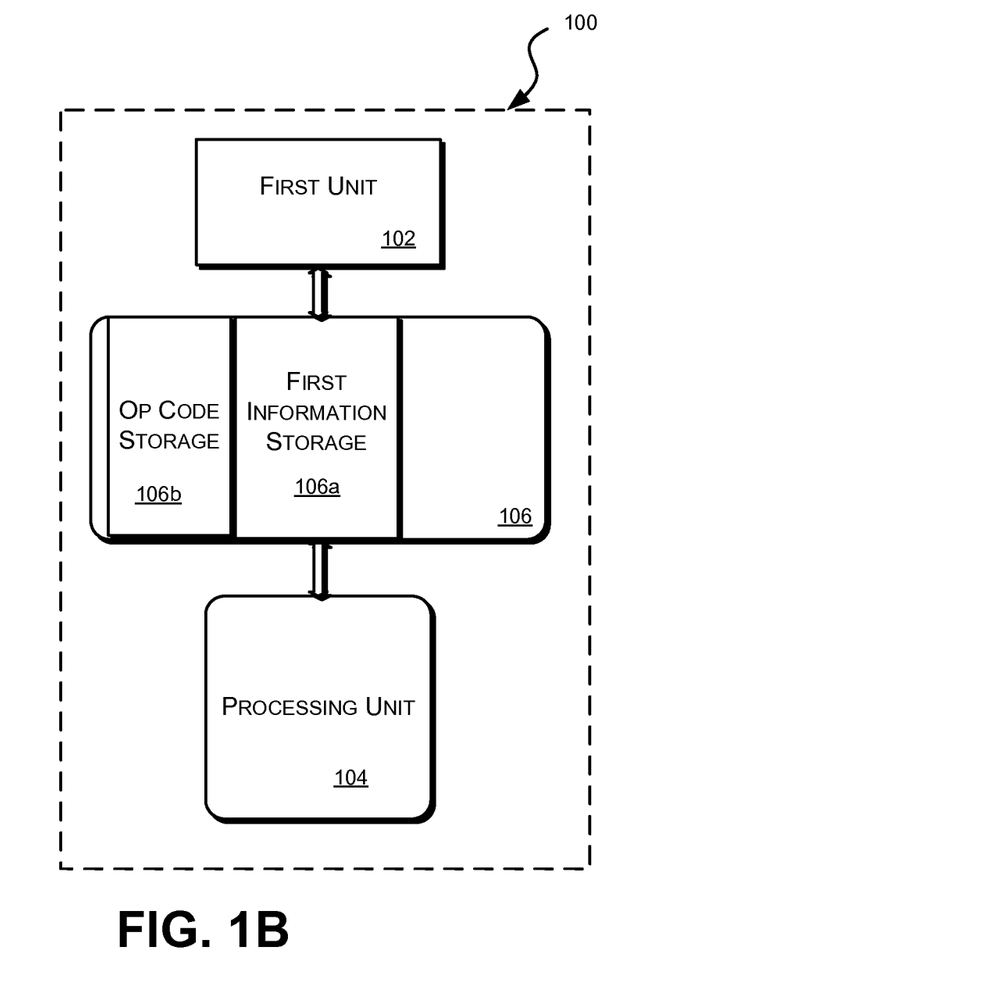

Thus, in some embodiments, the information storage 106 may include an operation code storage such that an operation code is written by the first unit 102 to the operation code storage to initiate the operation. Examples of operation codes include operation codes for executing a subroutine, a sequence of subroutines or a command etc. An example embodiment is shown in FIG. 1B in which an operation code storage 106b is provided as part of the information storage 106 of the device 100.

As will be described later, in example embodiments the operation code storage may be configurable such that the operation code storage can be set to be protected against writing of operation codes during the operation.

Operations executed by the processing unit 104 may in some embodiments include execution of dedicated data processing. In some embodiments, operations executed by the processing unit 104 include various operations associated with a set of operation codes. The set of operation codes may include operation codes for a command such as a command word or operation codes of a subroutine such as a subroutine execution word or operation codes for a sequence of subroutines.

The first information storage 106a may include any type of digital information storages such as buffers, registers, RAM-memories etc. In examples, the first information storage 106a may for example include storage of the volatile type such as storage based on transistors, for example a register or buffer. The information storage assembly 106 may in some embodiments include other information storages which may be of the same or of different type than the first information storage 106a.

In some embodiments, additional storages such as non-volatile memories may be provided within the device 100 such as a ROM for booting or a flash memory for storing data information or program information. The non-volatile storages may be partitioned or separated according to functional needs, for example a flash memory may be partitioned into a data flash memory, a program flash memory and a key flash memory. Some of the additional non-volatile memory may also be access restricted such that for example only the processing unit 104 is allowed to read/write on a key flash memory since keys stored in the flash memory are considered secure information only available for the processing unit 104.

The first unit 102 is coupled to the first information storage 106a for example via a bus and the processing unit 104 is also coupled to the first information storage 106a for reading and writing information. In some embodiments, the processing unit 104 is implemented within a module, the first information storage 106a being also part of the module. The module or the processing unit 104 may in some embodiments have a master and slave functionality such that the function of a master of the bus as well as the function of a slave of the bus can be provided.

In example embodiments, the processing unit 104 may be a secure data processing extension for the first unit 102 such as a cryptographic program controlled engine or cryptographic state machine. The processing unit 104 may for example execute security-related operations for performing security-related data processing which may include encoding or decoding, code verification, authentification and other processing. An example list of security operations include AES standard 128 bit cryptographic functions such as ECB encryption, ECB decryption, CBC encryption, CBC decryption, CMAC generation, CMAC verification etc.

Security-related operations may for example be used in the device 100 for authentication or authorization of new items, units, assembly groups etc when newly implemented or integrated or when replacing existing items. Furthermore, security-related operations may for example be used in the device 100 for decoding a software code in order to provide software security or other encoding or decoding functions for the device 100. Moreover, security-related operations may for example be used in the device 100 for providing secure booting of the device by detecting false or corrupted software provided to the CPU. However, it is to be noted that the above are only some examples of the many uses of security related operations.

In some embodiments, a set of specific security-related operation codes may be provided for initiating a respective type of security-related operations. The processing unit may then be configured to decode and provide an execution of at least one security-related subroutine or security-related command for the first unit.

In some embodiments, the processing unit 104 may be a substantially hardware-based processing unit such as a state machine which provides hardware-based data processing. For example, in one embodiment, the processing unit 104 may be a security hardware extension providing the above described security-related operations. While a hardware-based data processing may limit the flexibility of the system, it adds however to the security of the data processing in view of being less prone to manipulations from hostile users.

In other embodiments, the processing unit 104 may be a CPU or processing unit of a CPU-related type.

Examples of the information transferred and stored in the information storage 106a includes data related to a type of operation, input parameters of the operation such as input parameters of a command or subroutine or other parameters which are associated or required by the processing unit 104 with respect to the execution of a data processing operation. Furthermore, in some embodiments, the first information storage 106a is also storing the output information of the operation executed by the processing unit 104 which are to be output after the execution. The output information may for example be transferred to the first unit 102 which requested the operation. Such output information include output parameters of a subroutine or command such as results, intermediate or partial results or any other output parameter related to the operation which was executed by the processing unit 104. In some embodiments, the first information storage may for example be a data storage storing the input and output data information.

In example embodiments, the first information storage 106a is controlled with regards to read/write access in a manner which is different from known usages of information storages. The first information storage 106a being in general accessible by the first unit 102 and the processing unit 104 for reading and writing of information, is set temporarily to be not accessible for the first unit 104. In more detail, the first information storage 106a is set to be during an operation of the processing unit 104 no longer accessible for the first unit 102. However, the first information storage 106a is still fully accessible for the processing unit which executes the operation.

In other words, the first information storage 106a has a specific access protection which protects the first information storage 106a from a write or read access by the first unit 102 (and any other external unit if provided) while the first information storage 106a is however fully accessible by the processing unit 104 during the operation. For example, the processing unit 104 may during the operation read the information stored in the first information storage 106a, the processing unit 104 may write information such as intermediate or internal parameter values, results or other information during the operation to non-used locations of the first information storage 106a or may overwrite the information stored in the first information storage 106a with new information. In example embodiments, the above described access protection may be hardware-implemented, i.e. the logic preventing the access may be fully hardware-implemented logic. This may additional provide security as no modifications to the security mechanism can be made by a potential attacker.

The above described setting of the first information storage 106a in a first access mode in which the information storage 106a is fully accessible by the first unit 102 and the processing unit 104 or other external units and in a second access mode in which the first information storage 106a is only accessible by the processing unit with restricted access by the first unit 102 (and any other external unit if provided) allows a secure operation such that the data processing executed by the processing unit 104 can be provided insular. Moreover, the first information storage 106a can be used by the processing unit 104 to store internal information during the operation such as intermediate data processing results, pointer values etc. during data execution etc. This information may be security-critical and is protected by the above described access protection control from any external read during the operation. Information written in the first information storage 106a which is no longer necessary may be deleted or may be overwritten with other information by the processing unit 104.

While additional circuitry may be required for implementing the above controlling of protection, a reduction of the memory space can be achieved in view of the internal use of the first information storage during operation while still a secure and insular data processing is provided during a security-related operation by the processing unit 102.

It should be noted that in example embodiments the first unit 102 requested the operation to be performed by the processing unit 104 by transferring an operation code to an operation code storage and transferring information to the first information storage 106a, but the first unit 102 is essentially upon starting the operation automatically deprived of any access or control over the first information storage 106a at least as long as the operation is executed by the processing unit 104. This allows the very efficient usage of storage space since the storage space of the first information storage 106a may be used for different tasks such as writing an input parameter by the first unit 102, reading an output parameter by the first unit 102 and storing information during operation by the processing unit 104 while still preventing an attacker from extracting any information related to the internal data processing provided by the processing unit 104.

In some embodiments, the first information storage 106a is provided by an interface or as part of an interface between the first unit 102 and the processing unit 104. Such an interface may be a user interface. In some embodiments, the interface may have in addition to the first information storage operation code storage and/or a status bit storage. The first unit 102 may for example request an operation executed by the processing unit 104 by transmitting information to the information storage 106 and provide information related to the operation such as input parameters etc to the first information storage 106a. Such an interface having the above access-protection may then be considered as a secure interface between the processing unit 104 and the first unit 102 since it secures and provides insular operation of the processing unit 104 during the execution of the operation.

The access protection may be provided in some embodiments in a hardware-like manner. In some embodiments, the first information storage 106a may be electrically decoupled by control of transistors to prevent writing or reading when being access protected. In some embodiments, a logic circuit may be implemented which provides a predetermined bit sequence such as a bit sequence with all zeros back to the first unit 102 when reading is attempted during access protection by the first unit.

In example embodiments, the control of the access protection is external to the first unit 102 for example within a controller associated with the first information storage 106a or a controller associated with the processing unit 104.

Figure 6:
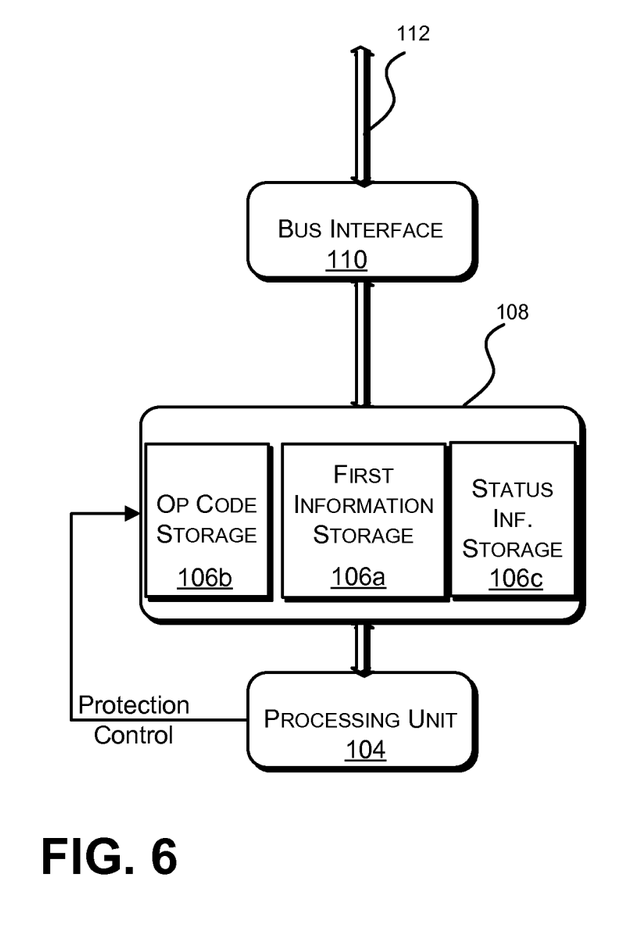
FIG. 6 shows a block diagram according to an example embodiment.

In some embodiments, the access protection for the first information storage 106a is controlled by the processing unit 104. Furthermore, the controlling with regards to which physical storages are part of the first information storage 106a and therefore the control of the size of the first information storage 106a may also be provided by the processing unit 104. FIG. 6 shows a block diagram of an example in which the processing unit 104 controls the access protection for the first information storage 106a, the operation code storage 106b and a status information storage 106c. The first information storage 106a, the operation code storage 106b and the status storage 106c are part of a user interface 108 which is coupled to a bus interface 110. The bus interface 110 is capable to connect to a bus 112 for transferring information from the first information storage 106a, the operation code storage 106b or the status information storage 106c via the bus 112 to the first unit 102 (not shown in FIG. 6) and vice versa from the first unit 102 to one of the storages 106a, 106b or 106c. The user interface 108 is further coupled to the processing unit 104 for transferring the information stored therein to the processing unit 104 and vice versa information from the processing unit 104 to the user interface 108.

The controller may in one embodiment be implemented to switch the first information storage from a first operation mode to a second operation mode based on the operation code written in the operation code storage by a first unit. The data information storage is in the first operation mode configured to be read/write accessible for the first unit and in the second operation mode configured to be read/write accessible only for a processing unit executing a data processing based on the operation code.

The access protection control as outlined in the above example embodiments may be used to provide a flexible security protection as will be further outlined below. For example, in one embodiment the first information storage may comprise or may be subdivided into a plurality of sub-unit storages. For example in one embodiment a sub-unit storage may be a single register such that the first information storage 106a comprises a plurality of single registers. However, other sub-unit storages may be provided by subdividing the information storage 106 into a plurality of regions, parts or sections. Each of the plurality of sub-unit storages may then be individually access-protected independent of each other sub-unit storage. The access protection may be changed during data processing. For example, when the execution of a subroutine or a command during the data processing is completed, the type of protection may be changed for the execution of the next subroutine or command within the same data processing. Moreover, each of the different sub-unit storages can have a different type of protection for example, a first type of read/write protection (no read and write access) with respect to the first unit 102 during the execution of an operation, a second type which allows a reading and writing for the first unit 102 during the execution or a third type which allows only reading but not writing for the first unit 102 etc. In other words, the access protection can be individually and independently set for each sub-unit storage and the access protection can be individually and independently set in an active protection for reading, writing or both.

In one embodiment, prior to starting an operation during the data processing by the processing unit 104, it may be determined which of the available information storage 106 is included in the first information storage 106a having the above outlined access protection. By determining the first information storage 106a prior to execution of an operation, the storage size of the first information storage 106a can be changed during the data processing. The type of access-protection for the first information storage or for each sub-unit storage may also be changed prior to the start of an operation during data processing. For example, when the first information storage 106a includes a plurality of registers, a first set of registers from the plurality of registers may be determined to be part of the first information storage having the above described access protection and an individual access-protection may be assigned to each register. Such determining may in one embodiment be dependent on the type of operation. In one embodiment, the determining may be provided after determining the operation code which is provided to the operation code storage. In other words, the size of the information storage having a particular protection with regards to write and/or read can be individually tailored during the data processing to the needs for the current operation for example before the starting of a specific operation during the processing.

In some embodiments, a selective protection can be provided during operation of the processing unit 104 which allows write-access (or read-access or both) only for one specific operation code or a specific group of operation codes while write-protection is maintained for all other operation codes. In some embodiments, such a selective protection is implemented in an operation code storage. In other words, the operation code storage is then selectively protected against writing of operation codes during the operation. In an example embodiment, the specific operation code allowed for writing during operation of the processing unit 104 may be an operation code for an abort command resulting in an aborting of the operation. This restricts the possibility of attacks during an operation and allows only to abort an operation but not to provide any other operation codes during an operation.

Furthermore, in some embodiments a control may be provided which allows after completion of the execution of an operation code only a specific operation code to be next executed. For example, operation codes may be allowed to be sequentially executed only in a particular order. This adds additional security against possible attacks and prevents detecting of information with respect to the data processing of the processing unit 104.

In some embodiments, the information storage 106 may include in addition to the first information storage 106a at least one further information storage which may be readable and/or writeable during the operation of the processing unit 104. For example, the information storage 106 may include a status information storage which according to one embodiment may be provided readable for the first unit 102 during the operation of the processing unit 104.

After the execution of the operation, the first information storage 106a can be made again accessible for the first unit 102. The first unit 102 is then allowed to read from the first information storage 106a information such as an output parameter of the operation, a status of the operation or information indicating an error occurred during the operation. In some embodiment, the first information storage 106a may be made accessible only after a sequence of operations such as a sequence of commands or a sequence of subroutines are completed. In some embodiments, the first information storage may be made after a completed operation readable but not writeable and only read/write-accessible after a sequence of operations is completed.

In some embodiments, an interrupt may be provided after the completion of an operation to notify the first unit 102 or the system on the completion. The providing of an interrupt may in some embodiments be depending on the operation code. In some embodiments, one or more dedicated bits may be provided in an operation code storage to indicate whether an interrupt is provided after completion of the operation indicated by the operation code.

In some embodiments, an interrupt may be provided after the abortion of an operation. In some embodiments, an interrupt is suppressed after an abortion of an operation. In some embodiments, a selective interrupt mechanism may be provided which allows configuring whether an interrupt is provided after an abortion of the operation or not. The selective interrupt scheme allows additional flexibility and a tailored use in terms of security for the system.

The first information storage 106a may be functionally subdivided in accordance with the output information provided to the first unit 102. For example, the first information storage 106a may include a status information storage dedicated for outputting the status of the operation for example by one or more status bits, or an error information storage dedicated for outputting error information indicating the occurrence of an error and/or the type of an error during the operation. As outlined above, also for these information storages the access-protection can be provided in an individual and independent manner.

In some embodiments, a change of the status such as a change indicated by a status bit in the status information storage may cause the flagging of an interrupt. In some embodiments, the operation code storage may contain a dedicated storage for storing one information indicating whether an interrupt is to be flagged after completion of the operation and/or after abortion of an operation. Such information may in some embodiments be an Interrupt-Enabled bit stored in the operation code storage. In some embodiments, the Interrupt-Enabled bit can be altered during the execution of an operation. This allows suppressing an interrupt when an operation is aborted. To this end, the Interrupt-Enabled bit may be deleted or altered from enabled to disabled when the operation code for abortion of the operation is written in the operation code memory.

Figure 5:
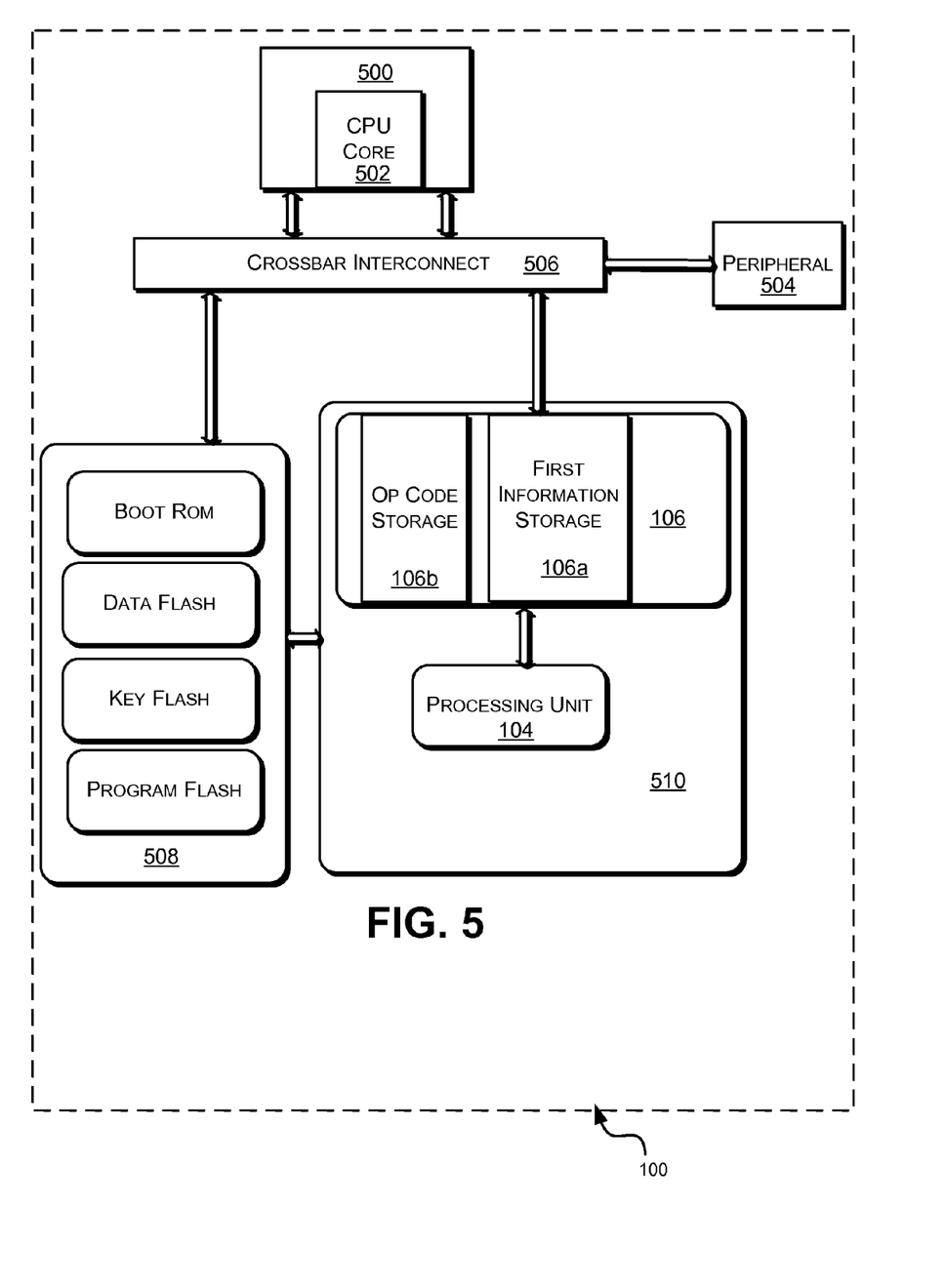
FIG. 5 shows a block diagram according to an example embodiment.

As already mentioned above, the device 100 may in some embodiments include in addition to the first unit 102 other units which are connectable to the first information storage 106a for requesting and providing input parameter information for the operation of the processing device 104. In some embodiments, the first storage 106a is therefore coupled to a bus having multiple units connected thereto including the first unit 102. FIG. 5 shows an example of a device 100 having a program controlled processor 500 with a CPU Core 502 and a peripheral 504. The processor 500 and the peripheral 504 are connected via a crossbar interconnect 506 to information storage assembly 106 including the first information storage 106a and the operation code storage 106b. The information storage assembly 106 is part of a module 510 including also the processing unit 104. An information storage assembly 508 is provided which may for example include a Boot ROM, a data flash, a program flash and a key flash. The processor 500 and the peripheral 504 are connected via the crossbar 506 to the second storage assembly 508. The module 510 is also connected to the storage assembly 508 to read or write data there from. Some portions of the storage assembly 508 such as a key flash may be exclusively accessible by the processing unit 104 for security reasons.

Figure 2:
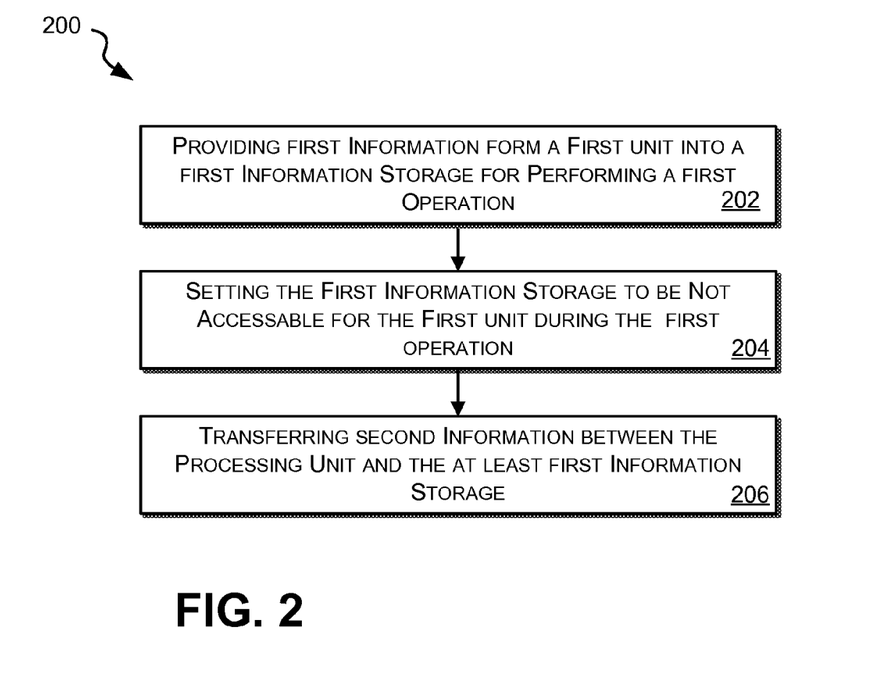
FIG. 2 shows a flow chart diagram according to an example embodiment.

A flow chart 200 of an example process which may be implemented for example in the device 100 will now be shown with respect to FIG. 2. The flow chart 200 starts at 202 with the providing of first information from a first unit into a first information storage for performing a first operation of a processing unit.

The first information storage is set at 204 to be non-accessible for the first unit. The first information storage is secured against a reading from the first information storage by the first unit and against a writing into the first information storage by the first unit. The setting of the first information storage to be not accessible for the first unit during the operation is in embodiments activated automatically when the operation code for performing the operation is stored in the operation code storage after it has been transferred from the first unit to the operation code storage. In other words, the first information storage is automatically locked for access protection by the first unit when the operation code storage is stored in the operation code storage. Setting the first information storage to be non-accessible for the first unit 102 may be achieved by an automatic locking into the above described access protection based on the writing of the operation code in the operation code storage. In some embodiments, the automatic locking may be hardware-implemented. For example, a hardware implemented logic may determine a code word written into the operation code storage and may depending on this determination lock the first information storage. In some embodiments, if the first unit 102 attempts or tries to read from the first information storage during the locking, a predefined bit pattern, for example an information including only bits of value 0 may be returned to the first unit 102. In some embodiments, if the first unit 102 attempts or tries to write information in the locked state, the writing may be ignored without returning a message. In some embodiments, an information such as a message may be returned to the first unit 102.

At 206, second information is transferred between the processing unit and the at least first information storage during the first operation of the processing unit. The second information can be written by the processing unit into the first information storage because the first information storage is read/write-accessible for the processing unit during the operation of the processing unit. In example embodiments, the processing unit is during the operation of the processing the only unit having read/write access to the first information storage.

In example embodiments, the processing unit accesses the information in the first information storage 106a during the operation to calculate at least one result based on the information.

Thus, at least a part of the information from the first information storage 106a may be transferred to the processing unit during the first operation, for example to internal registers of the processing unit 104.

Figure 3:
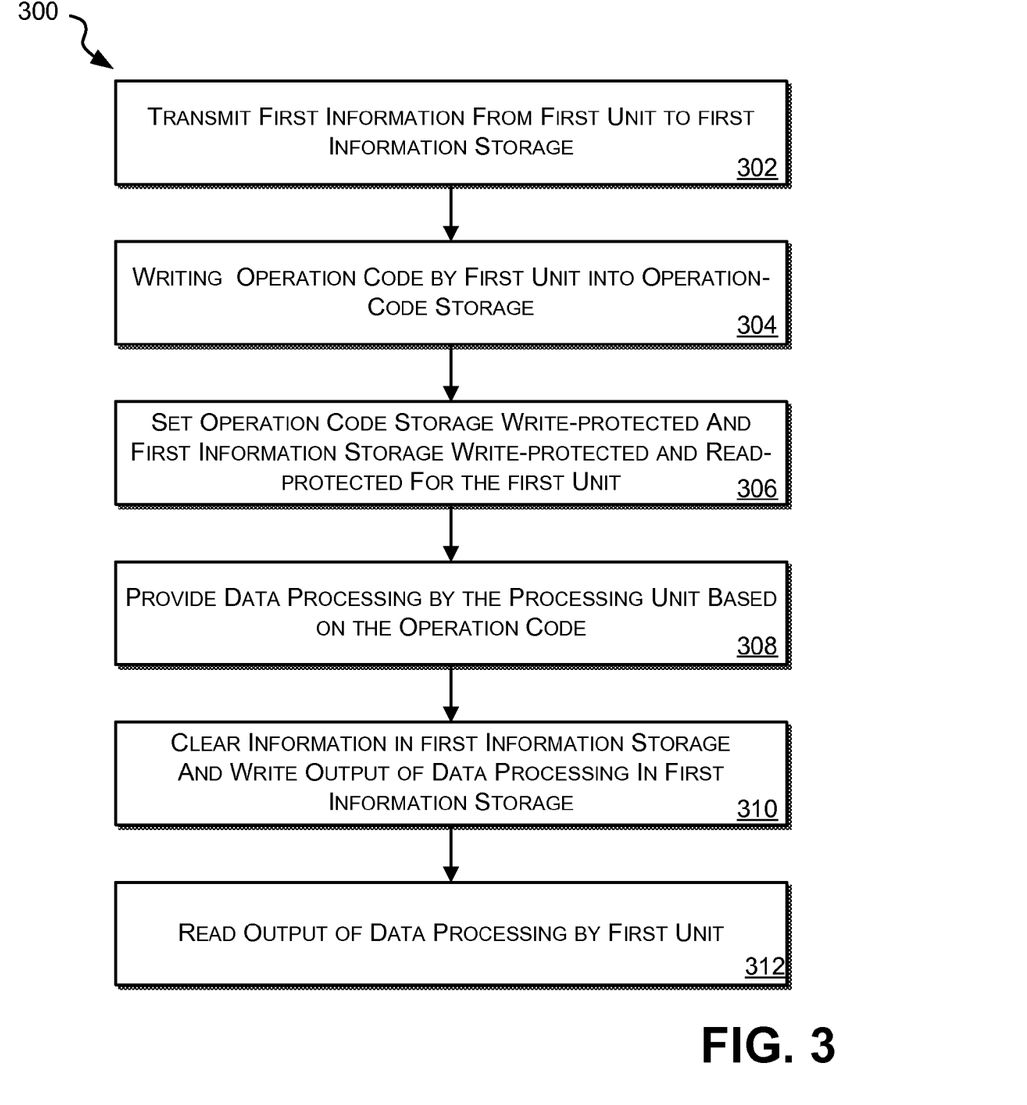
FIG. 3 shows a flow chart diagram according to an example embodiment.

As outlined above, a type of operation of the processing unit is selectable by the first unit as a result of a transferred operation code indicating for example a command or a subroutine to be executed by the processing unit. The operation code may be stored in an operation code storage. The processing device may read the operation code from the operation code storage, decode and analyze the operation code and provide the operation based on the operation code. The operation code storage may however be write-protected selective with regards to the operation codes, i.e. one or more specific operation codes may be allowed to be written while the rest is blocked. An example of a flow chart 300 is shown in FIG. 3.

The flow chart 300 starts at 302 with the transmitting of the first information from the first unit to the first information storage. At 304, the first unit writes an operation code into an operation code storage. The operation code storage may for example include a command buffer or command register. The first information storage and the operation code storage may in an example embodiment both be part of an interface provided between the processing unit and the first unit.

At 306, the operation code storage is then set to be write-protected with respect to the first unit. The setting of the write-protection with respect to the first unit is in embodiments activated by the writing of the operation code provided by 304. The write-protection may be a selective write-protection such that the write-protection is enabled for a group of operation codes while the operation code storage is at least for one operation code not write-protected. Furthermore, at 306 the first information storage is set write/read-protected with respect to the first unit. The write-protection of the operation code storage and the write/read-protection of the first information storage may be based on and activated by the writing of the operation code into the operation code storage. At 308, the processing unit may then execute a data processing operation such as the execution of a requested subroutine or a command based on the operation code transferred from the first unit to the operation code storage. At 310, the information in the first information storage is cleared and an output of the data processing such as a result for the requested operation or other output parameters is written by the data processing unit in the first information storage. Then, at 312, the output of the data processing is read out by the first unit.

In example embodiments, the first information storage may automatically be locked against read/write access by the first unit based on the operation code in the operation code storage.

In some example embodiments, the data processing unit may inform the first unit on the new status of the operation as being completed.

When the operation is aborted by writing an abort operation code into the operation code storage, at least a part of the information in the first information storage may not be accessible, i.e. readable for the first unit after the operation has been aborted. To this end, information may be deleted when an operation code for abortion is provided. In some embodiments, all information of the first information storage may be inaccessible for the first unit after abortion, for example by deleting all the information in the first information storage.

Furthermore, when the operation is completed without abortion, only a part of the information such as an expected output result of the subroutine or command may be readable for the first unit. In this way, information which are written by the processing unit during the operation for example as internal or intermediate result values and which may be security-critical in terms of allowing gaining of information related to the operations, structure of function of the processing unit can be prevented from being output to the first unit. To this end, according to an example, the output result of the operation is written in the first information storage and at least a part of the information except the output result is cleared or removed when the operation is completed or aborted. Only after the deletion of the information, read/write access for the first unit is given to the first information storage.

In other words, the first information storage prevents a first part of information within the first information storage from being externally output after the operation is completed or aborted but allows a second part of information within the first information storage to be output to the first unit after the operation is completed.

In an embodiment, a restriction control circuit may be implemented to provide the access control for the first information storage. The restriction control circuit may restrict an access to the first information storage in the following manner. When the first unit requests an execution of a subroutine or command, which is to be executed by the processing unit information for executing the subroutine or command is provided from the first unit to the first information storage. After the information is provided to the first information storage, access restrictions which restrict the access of the first information storage are provided for the first unit and possible other units except for the processing unit.

In addition, as already outlined above, access restrictions may also be provided for a second information storage such as for example an operation code storage.

FIGS. 4A to 4D show now timing diagrams of example usages in accordance with the above described first information storage and operation code storage.

Figure 4A:
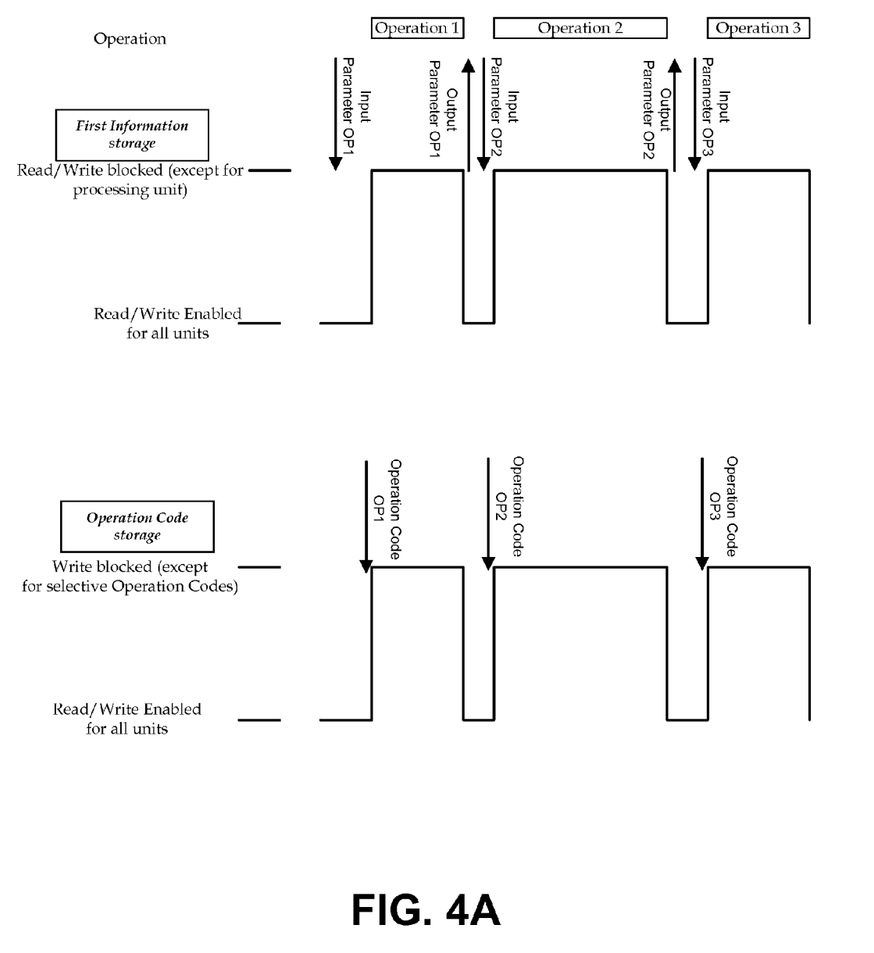
FIGS. 4A to 4D show examples according to an embodiment.

FIG. 4A shows a timing diagram for an example in which three operations designated in FIG. 4A as OP1, OP2 and OP3 are performed sequentially as part of a data processing. The operations may for example include an execution in accordance with the operation code of three command words. Prior to the starting of operation OP1, the first information storage and the operation code storage are write-enabled and read-enabled (read/write enabled). An operation code for operation OP1 is then transferred from the first unit to the operation code storage and the input parameters for Operation 1 are transferred from the first unit to the first information storage. After the storing of the operation code and the input parameter for operation OP1, the protection mode of the first information storage is then changed from read/write enabled to read/write protected with respect to the first unit and all other external units. With respect to the processing unit executing the operation OP1, the first information storage is still read/write accessible. In the operation code storage, the access protection is changed from read/write enabled to write blocked. In the example shown in FIG. 4A, the write blocked mode is a selective blocking mode which blocks the writing for all operation codes except for predetermined operation codes such as an operation code for abortion of an operation. The storage provided for the at least one input parameter and the at least one output parameter is in embodiments dynamically configurable such that for each operation storage can be assigned for the input and output parameters depending on the operation executed. In some embodiments, the storage for the input and output parameters may overlap such that the storage for the input parameters is at least partially used for storing output parameters.

During the execution of the operation OP1, the first information storage and the operation code storage remain in the above described mode. After completing the execution, the first information storage is again set to be read/write enabled. The data processing unit may then inform the first unit on the new status of the operation being completed and the first unit may read out an output parameter written into the first information storage by the processing unit during the execution. Furthermore, after completing the first operation OP1, the operation code storage is again set to be read/writable. The new operation code for operation OP2 and the new input parameter for operation OP2 are then transferred and stored in the operation code storage and the first information storage, respectively, and the operation Op2 is executed as well as a further operation OP3 in the manner described above.

Figure 4B:
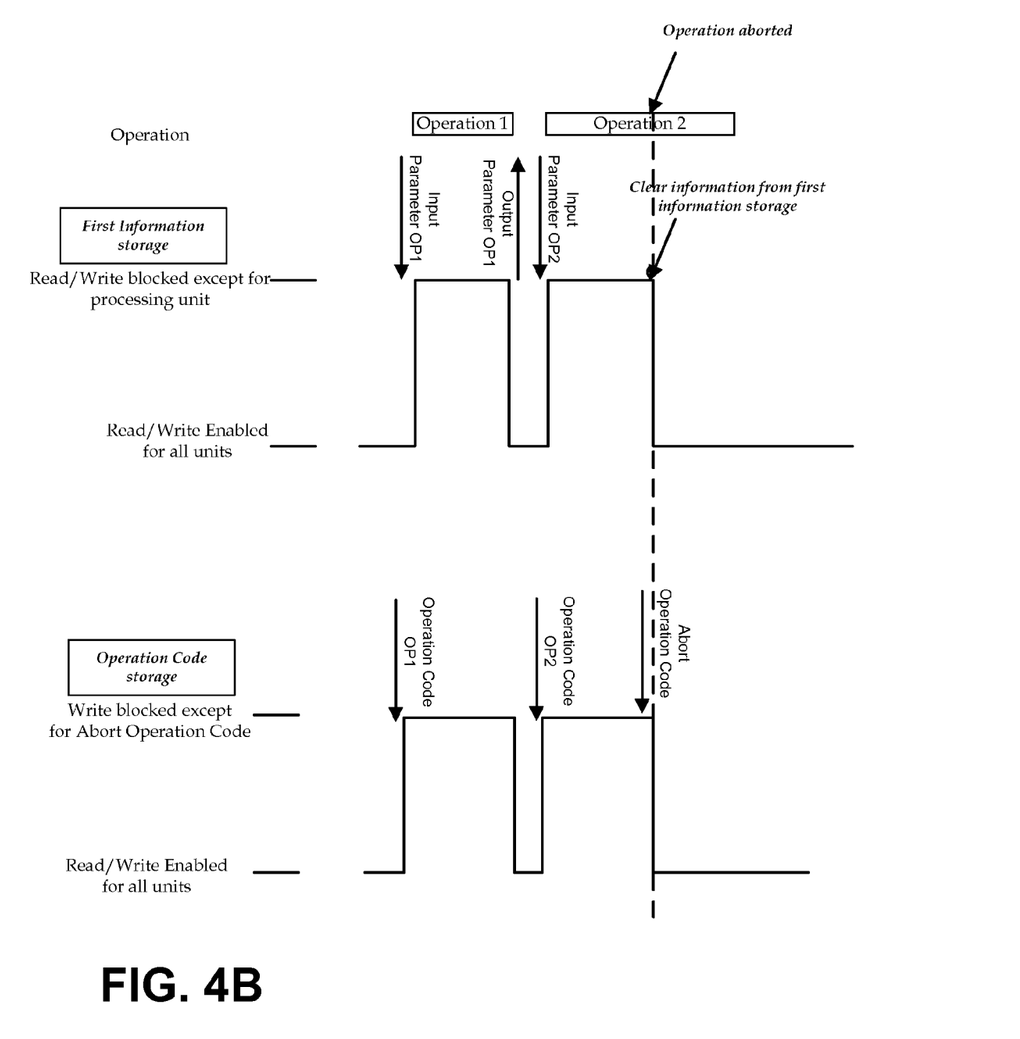

FIG. 4B shows the example of FIG. 4A when an abortion occurs during operation OP2. As can be seen in FIG. 4B, an abort operation code is transferred from the first unit to the operation code storage during the execution of operation OP2. Although the operation code is set to be selective write blocked, since the abort operation code is amongst the specific operation codes, the abort operation code is allowed to be written into the operation code storage.

After the abort operation code is written into the operation code storage, the operation is aborted and information stored in the first information storage is cleared. As outlined above, all information stored in the first information storage may be deleted or a selective deleting of information may be performed. After the information from the first information storage is cleared, the first information storage returns to the read/write enabled mode allowing further to write information therein. Also the operation code storage returns to the mode in which read/write is enabled.

Figure 4C:
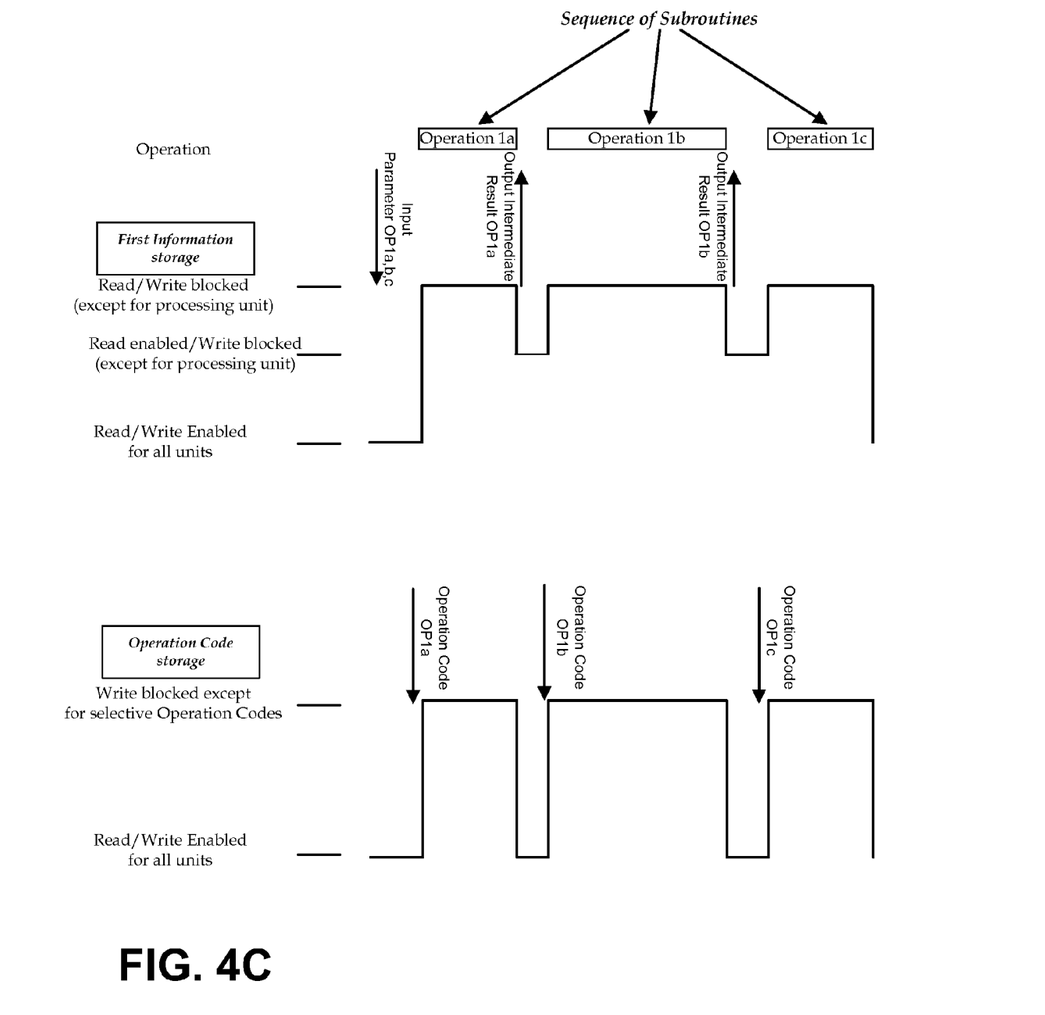

FIG. 4C shows an example in which a sequence of operations OP1a, OP1b, OP1c is performed with the outputting of intermediate results after each completed operation. The sequence of operations is for example in one embodiment a sequence of subroutines or commands. At the beginning, the first information storage and the operation code storage are read/write enabled and the input parameters are written in the first information storage. The operation code OP1a for performing operation OP1a is written into the operation code storage. Then after Operation OP1a is completed, the first information is set to be read enabled but not to be write-enabled. This allows the intermediate result of each operation to be read out from the first information storage. Only after completion of the overall sequence, the first information storage as well as the operation code storage is set read/writeable for all units. After completion of the operations 1a and 1b, the operation code storage is again set to be writeable for the first unit to allow the respective subsequent Operation Code in the sequence to be written into the Operation Code storage. The writing of the Operation Code then automatically activates the switching to the mode in which the reading and writing access on the first information storage and the writing access on the operation code storage (except for the selective Operation Codes) is blocked for the first unit.

For each operation of a subroutine or operation sequence, new input parameter may be written in the first information storage prior to the starting of the respective operation. This may depend on the previous operation which sets the access protection for the first information storage. Thus, in some embodiments, the previous executed operation within a sequence of operations determines which access protection is applied between two successive operations. Instead of switching for the first information storage between the successive operations to the protection mode "Read enabled/Write blocked" as shown in FIG. 4C, the first information storage may switch after the completing of an operation to the mode "Read/Write Enabled" which allows in addition to the reading of the intermediate results also the writing of the one or more new input parameter into the first information storage. The two above access protections between successive operations within a sequence of operations may therefore in some embodiments occur both within one sequence of operations such that after one operation code no new input information is input and therefore the protection mode is switched to the mode Read enabled/Write blocked while for another operation code the protection mode is switched to the Read/Write enabled to allow writing of new input parameters.

Furthermore, in some embodiments the access protection between two operations of a sequence of operations may be different for different portions or parts of the first information storage. For example, a certain portion of the first information storage or selected sub-storages (for example registers) of the first information storage may be set after an operation to be "Read enabled/Write blocked" while another portion or other selected sub-storages of the first information storage may be "Read/Write enabled" after the same operation. This allows when new input parameters are to be written between two successive operations that only a restricted area is allowed to be accessed by the first unit while the other storage areas or sub-storages of the first information storage are still protected. The selected portions or the sub-storages of the first information storage which are write-enabled after an execution may be dynamically selected depending on the operation code executed.

In some embodiments, the storage space of the first information storage may be utilized different for input parameters than for output parameters. Furthermore, in some embodiments output parameters are allowed to overwrite input parameters in order to utilize the storage space in a most efficient manner.

FIG. 4C thus shows that in some examples the first information storage may be at least selectively accessible when an operation is not performed by the processing unit for example between two successive operations.

Figure 4D:
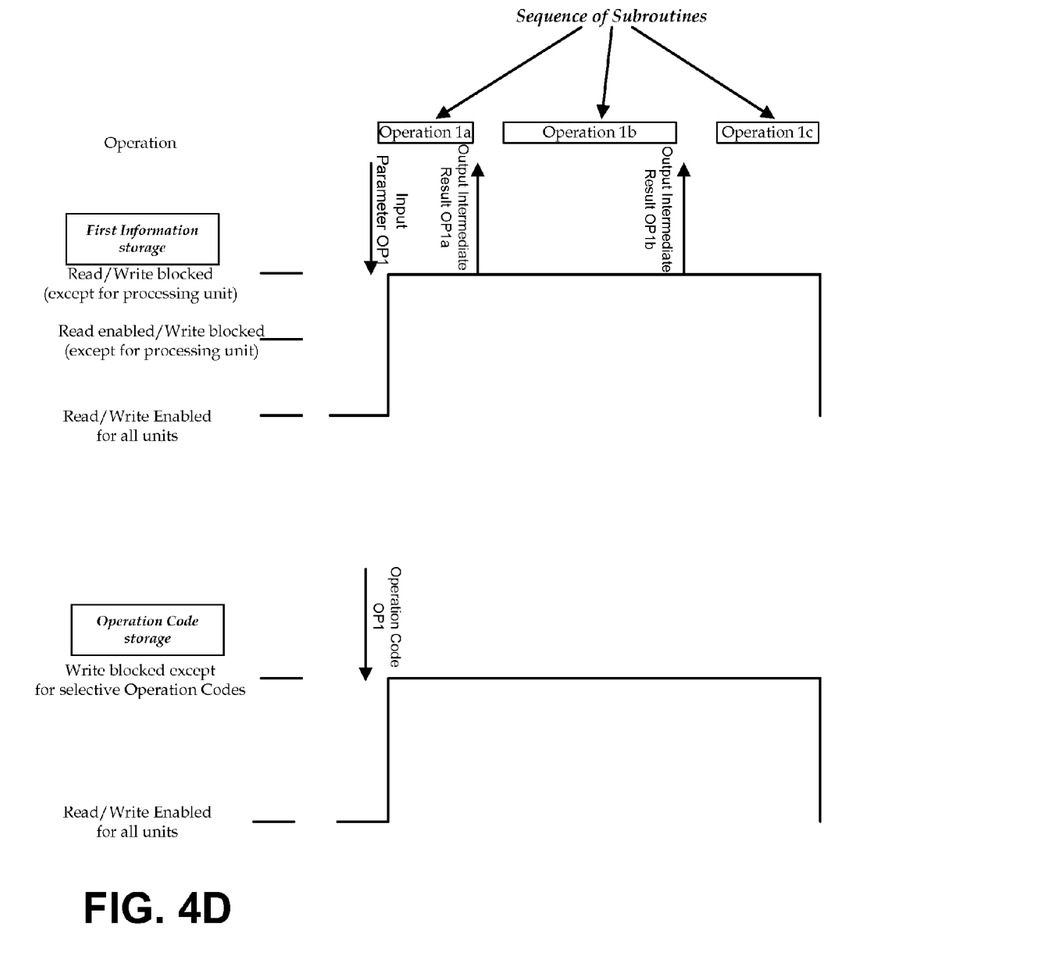

FIG. 4D shows an example similar to FIG. 4C without the reading of intermediate results after each completed subroutine. Here the first information storage 106a is set from the beginning of the first operation OP1a of the sequence until the completion of the last operation OP1c of the sequence to be read/write blocked (except for the processing unit).

The above described examples show that an individual and flexible protection can be achieved with the described protection mechanism. The protection can for example include different types of protection for different types of operation codes. Furthermore, although not shown in FIGS. 4A-4D, only a part of the first information storage 106a may have the above described protection while other parts of the first information storage may have during the execution of the operations other protections with regards to read and write. In other words, the protection may include different protection types assigned to the different portions or sub-storages of the first information storage. Furthermore, the assignment for the different portions or sub-storages may in some embodiments be depending on the type of operation code as outlined above. In addition to the first information storage 106a, a second or further information storage may be provided with the same protection mechanism allowing with regards to the first, second and further information storages different types of protection during the execution of an operation by the processing unit. Also other information storages which may have a fixed protection scheme may be provided for example a protection allowing exclusive reading and writing only for the processing unit.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" or "unit" may in embodiments include any device, apparatus circuits, hardware, software, firmware, chips or other semiconductors as well as logical units or sub-units or physical implementations etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods or a circuit configured for performing the respective steps of these methods.

Further, it is to be understood that the disclosure of multiple steps or functions disclosed in the specification or claims may not be construed as to be within a specific order. Therefore, the disclosure of multiple steps or functions will not limit these to a particular order unless such steps or functions are not interchangeable for technical reasons.

Furthermore, in some embodiments a single step may include or may be broken into multiple sub-steps. Such sub-steps may be included and part of the disclosure of this single step unless explicitly excluded.

What is claimed is:

1. A method comprising:
   providing first information from a first unit into an information storage of an interface for performing a first operation of a processing unit, wherein the interface is coupled between the first unit and the processing unit;
   wherein the performing of the first operation is requested by the first unit;
   providing an access restriction which restricts the read access and write access of the information storage for the first unit during the performing of the first operation of the processing unit;
   wherein during the first operation of the processing unit, second information is transferred between the processing unit and the information storage and written to the information storage, and
   after the performing of the first operation, providing at least a read access to the information storage such that the second information written during the performing of the first operation is readable.

2. The method according to claim 1, wherein the information storage is read-accessible and write-accessible during the first operation of the processing unit only for the processing unit.

3. The method according to claim 1,
   providing the first information from the information storage to the processing unit; and
   calculating at least one result during the first operation based on the first information.

4. The method according to claim 1, wherein a data processing type during the first operation of the processing unit is selectable by the first unit by writing an operation code to an operation code storage, wherein the data processing type determines an access restriction type during the first operation.

5. The method according to claim 1, wherein the access restriction provides for at least one portion or at least one sub-storage of the information storage a different access restriction type than for another portion or another sub-storage of the information storage.

6. The method according to claim 1, wherein the first unit is a program-controlled unit or a peripheral.

7. The method according to claim 1, wherein the first operation includes an execution of a subroutine or an execution of a sequence of subroutines or an execution of a command or an execution of a sequence of commands, wherein the first information includes at least one of the following:
   an input parameter for the subroutine or the sequence of subroutines or the command or the sequence of commands, and
   an identifier for the type of the subroutine or command.

8. The method according to claim 1, wherein the first operation is an execution of at least one of a subroutine or a command or a sequence of subroutines or a sequence of commands, wherein the information storage is automatically locked against read/write access of the first unit when execution of the first operation starts.

9. The method according to claim 1, wherein between two successive operations of a sequence of operations an access by the first unit to the information storage is selected dependent on the previous executed operation of the two successive operations to be in one of the following access modes:
   write-enabled and read-blocked,
   write-enabled and read-enabled,
   write-blocked and read-blocked,
   write-blocked and read-enabled.

10. The method according to claim 1, wherein the first unit writes an operation code from the first unit to an operation code storage for initiating the first operation by the processing unit, wherein the information storage is activated for access restrictions by the writing of the operation code to the operation code storage.

11. The method according to claim 1, wherein the first unit writes an operation code from the first unit to an operation code storage for initiating the first operation by the processing unit; and
    wherein the operation code storage is protected against writing of operation codes during the first operation.

12. The method according to claim 11, wherein the operation code storage is selectively protected against writing of operation codes during the first operation such that the operation code storage is write-protected with respect to a first set of operation codes and the operation code storage is write-enabled for writing of at least one other operation code.

13. The method according to claim 1, wherein, after the performing of the first operation, the information storage is made accessible for the first unit for reading out at least one of:
    an output parameter of the first operation;
    a status of the first operation; and
    information indicating an error occurred during the first operation.

14. The method according to claim 1, wherein, after an aborting of the first operation, at least a part of the information which has been stored in the information storage during the first operation is not accessible for the first unit.

15. The method according to claim 1, further comprising:
    storing a result of the first operation in the information storage;
    deleting at least a part of the information stored in the information storage, after the operation is completed or aborted; and
    providing access for the first unit to read the second information after the deleting is completed.

16. The method according to claim 1, wherein a first part of information stored within the information storage during the first operation is prevented from being output after the operation is completed or aborted, and
    wherein a second part of information within the information storage is output to the first unit after the first operation is completed.

17. The method according to claim 1, wherein the processing unit determines prior to the first operation a configuration of the information storage, wherein the configuration includes at least one of:
    a size of the information storage,
    the sub-unit storages included in the information storage,
    an access restriction during the first operation for the information storage.

18. The method according to claim 1, further comprising: performing a second operation of the processing unit and providing the access restriction for the information storage during the performing of the second operation different than during the performing of the first operation.

19. The method according to claim 18, wherein after the performing of the second operation, information written in the information storage during the performing of the second operation is protected against a read access of the first unit.

20. A method of restricting access to an information storage, the method comprising:
requesting an execution of a subroutine or command, wherein the execution is requested by a first unit and the subroutine or command is executed by a processing unit;
providing, by the first unit, information for executing the subroutine or command to a first information storage;
providing access restrictions which restrict the read access and write access of the first information storage for the first unit during execution of the subroutine or command by the processing unit; wherein the processing unit writes data into at least a part of the first information storage during the execution of the subroutine or command; and
after the execution of the subroutine or command, providing at least a read access to the first information storage such that the data written during the execution of the subroutine or command is readable.

21. A device comprising:
a processing unit to perform a data processing operation;
an operation code storage;
a data storage for storing data transferred between a first unit and the processing unit;
wherein the processing unit is configured to perform the data processing operation based on an operation code written in the operation code storage by the first unit and to write data during the data processing operation into the data storage; and
a controller to protect the data storage from being written and read by the first unit when the processing unit performs the data processing operation and to enable access for at least the first unit when the data processing operation is completed in order to read out at least a part of the data written by the processing unit during the data processing operation.

22. The device according to claim 21,
wherein the access is configured or configurable to automatically switch into a different mode based on the writing of an operation code to execute the data processing operation by the first unit to an operation code storage.

23. The device according to claim 22, further configured or configurable to indicate a status of the data processing operation to the first unit.

24. The device according to claim 23, wherein the processing unit is configured or configurable to select prior to the operation a configuration of the data storage, wherein the configuration includes at least one of:
a size of the data storage,
the sub-unit storages included in the data storage,
a protection during the operation for the data storage.

25. The device according to claim 24, wherein the requesting of an interrupt after a completion of an operation or after an abortion of an operation is configurable.

26. A device comprising:
an operation code storage;
a data storage for storing data transferred between a first unit and a data processing unit;
wherein the data processing unit is configured to perform a data processing operation based on an operation code written in the operation code storage by the first unit and to write data during the data processing operation into the data storage; and
a controller to protect the data storage from being written and read by the first unit when the data processing unit performs the data processing operation and to enable access for at least the first unit when the data processing operation is completed in order to read out at least a part of the data written by the data processing unit during the data processing operation.

27. The device according to claim 26, wherein the controller is configured to activate the protection of the data storage from access by the first unit based on the writing of an operation code into an operation code storage.

28. The device according to claim 27, wherein the data stored in the data storage includes at least one input parameter of the data processing or at least one output parameter of the data processing.

29. The device according to claim 26, wherein the data storage is during the data processing operation readable and writeable only by the processing unit.

30. The device according to claim 28, wherein the access by the first unit is at least one of a write access by the first unit or a read access by the first unit and wherein the data storage provided for the at least one input parameter and the at least one output parameter is dynamically configurable depending on the data processing operation.

31. An information storage arrangement comprising:
an operation code storage;
a data storage, wherein the data storage includes a plurality of sub-unit storages;
a controller to configure, prior to a data processing operation associated with an operation code stored in the operation code storage, for each of the plurality of sub-unit storages an access protection during the execution of the operation code, such that each of the plurality of sub-unit storages is access-enabled for a data processing unit executing the operation code and an access for a unit requesting the data processing operation is set to be read-blocked, write-blocked or read-and-write blocked dependent on a type of the operation code stored in the operation code storage.

32. The information storage arrangement according to claim 31, wherein the controller is further configured or configurable to protect during the operation code information storage from a write access by the first unit.

33. The information storage arrangement according to claim 31, wherein the controller is provided to protect the operation code information storage selectively from an information storage write access by the first unit such that the operation code information storage is write-protected if the operation code is within a first set of operation codes and such that the operation code information storage is enabled for writing at least one other operation code.

* * * * *